United States Patent
Sabard et al.

(10) Patent No.: US 10,800,918 B2
(45) Date of Patent: Oct. 13, 2020

(54) IMPACT-MODIFIED THERMOPLASTIC COMPOSITION HAVING A HIGHER LEVEL OF FLUIDITY IN THE MELTED STATE

(71) Applicant: ARKEMA FRANCE, Colombes (FR)

(72) Inventors: Mathieu Sabard, Serquigny (FR);
Benoit Brule, Beaumont-le-Roger (FR);
Jean-Jacques Flat, Goupillieres (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/301,251

(22) PCT Filed: Mar. 31, 2015

(86) PCT No.: PCT/FR2015/050825
§ 371 (c)(1),
(2) Date: Sep. 30, 2016

(87) PCT Pub. No.: WO2015/150687
PCT Pub. Date: Oct. 8, 2015

(65) Prior Publication Data
US 2017/0022363 A1    Jan. 26, 2017

(30) Foreign Application Priority Data

Apr. 2, 2014 (FR) ...................... 14 52901

(51) Int. Cl.
*C08L 77/02* (2006.01)

(52) U.S. Cl.
CPC ......... *C08L 77/02* (2013.01); *C08L 2205/025* (2013.01); *C08L 2205/03* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 3,963,799 A * | 6/1976 | Starkweather, Jr. | C08L 77/00 525/183 |
| 4,160,790 A | 7/1979 | Mason et al. | |
| 6,235,837 B1 | 5/2001 | Basset et al. | |
| 2004/0242774 A1 | 12/2004 | Fujimura et al. | |
| 2005/0165210 A1 | 7/2005 | Malet et al. | |
| 2006/0108708 A1 | 5/2006 | Wakita et al. | |
| 2009/0131569 A1* | 5/2009 | Schwitter | C08L 77/00 524/423 |
| 2010/0137516 A1* | 6/2010 | Hert | C08L 77/00 525/66 |

FOREIGN PATENT DOCUMENTS

| | | |
|---|---|---|
| CN | 101193982 A | 6/2008 |
| CN | 101903215 A | 12/2010 |
| EP | 0 272 695 A2 | 6/1988 |
| EP | 1 482 011 A | 12/2004 |
| EP | 1 568 487 A | 8/2005 |
| FR | 2 846 332 A | 4/2004 |
| JP | S63-168455 A | 7/1988 |
| JP | 06-133801 A | 5/1994 |
| JP | 2004-068740 A | 3/2004 |
| JP | 2006-028314 A | 2/2006 |
| JP | 2011-506201 A | 3/2011 |
| JP | 2014-111761 A | 6/2014 |
| WO | WO 2006/079890 A1 | 8/2006 |
| WO | 2009080616 A1 | 7/2009 |

OTHER PUBLICATIONS

Office Action (Notice of Reasons for Rejection) dated Oct. 30, 2018, by the Japanese Patent Office in corresponding Japanese Patent Application No. 2016-559646, and an English Translation, (19 pages).
English Translation of Office Action (First Office Action) dated Mar. 2, 2018, by the Chinese Patent Office in corresponding Chinese Patent Application No. 201580017644.4. (20 pages).

* cited by examiner

*Primary Examiner* — Ana L. Woodward
(74) *Attorney, Agent, or Firm* — Buchanan Ingersoll & Rooney P.C.

(57) ABSTRACT

A composition including: between 45 and 94.95 wt. % of a matrix having at least one polyamide; between 0.05 and 20 wt. % of at least one prepolymer, the proportion by weight of the polyamide matrix and that of the prepolymer being respectively between 60 and 99.9 wt. % and between 40 and 0.1 wt. % in relation to the total amount of polyamide-prepolymer; between 5 and 45 wt. % of at least one impact modifier; and between 0 and 20% of an additive, said composition having a higher level of fluidity in the melted state than the same composition without prepolymer.

21 Claims, 8 Drawing Sheets

IMPACT-MODIFIED THERMOPLASTIC COMPOSITION HAVING A HIGHER LEVEL OF FLUIDITY IN THE MELTED STATE

The present invention relates to impact-modified thermoplastic polyamide compositions comprising at least one prepolymer, having a greater fluidity in the melt state than a composition devoid of prepolymer, while retaining the same modulus and impact properties. It also relates to the use thereof for extrusion or injection, in particular for the manufacture of articles obtained by extrusion or injection, in particular for the manufacture of sports shoes, especially ski boots or running shoes, or compression molding.

The invention also relates to the use of prepolymers with impact-modified thermoplastic polyamide matrices to increase the fluidity in the melt state.

The invention also relates to a method for manufacturing said sports articles and the articles obtained by said method.

Thermoplastic polyamide-based compositions are raw materials capable of being transformed by extrusion, molding or injection, especially by injection molding, to manufacture plastic parts.

There are several major properties that it is desired to obtain for these polyamide-based compositions, especially when they are used in these transformation methods.

One of these properties is that these thermoplastic compositions used must be characterized, in the melt state, by a fluidity or rheological behavior compatible with the shaping methods of interest, such as injection molding. Indeed, these thermoplastic compositions must be sufficiently fluid when they are molten to be able to be easily and rapidly conveyed and handled in certain means for shaping, such as for example injection molding.

As a general rule, functionalized polyolefins, with or without ungrafted polyolefins added to them, are used to improve the impact properties of the polyamides. Nonetheless, the addition of these polyolefins is most often to the detriment of the fluidity in the melt state, generally because of reaction between the maleic anhydride of the functional polyolefin and the amine chain ends of the polyamide. Too high a viscosity may make the product difficult to use, especially for injection molding. In extrusion, too high a viscosity limits the line speed and productivity. It is therefore necessary to use other more fluid polyamides.

Patent EP 1568487 describes molded articles comprising:
a resin element which comprises a polyamide-series resin which may be a resin composition comprising a polyamide-series resin and a compound having an amino group comprising at least one polyamide oligomer, and
a resin element comprising a polyurethane-series resin.

This document does not mention the fluidity of the compositions obtained. EP 0272695 describes compositions comprising a mixture of a polyamide of high number-average molecular weight with a polyamide of low molecular weight in the presence of impact modifiers to obtain a polyamide of intermediate number-average molecular weight by transamidation.

WO 2006/079890 describes compositions comprising from 95 to 10 parts by weight of a polyamide having a number-average molecular weight greater than 30 000 g/mol and from 5 to 90 parts by weight of a polyamide having a number-average molecular weight from 15 000 to 30 000 g/mol.

Most surprisingly, it has been discovered by the applicant that the addition of prepolymers to a composition comprising functionalized polyolefins, with or without ungrafted polyolefins added to them, said composition having a high viscosity, made it possible to improve the fluidity of the latter and to thereby obtain a fluidity or rheological behavior compatible with the shaping methods of interest, such as injection molding.

The present invention relates to a composition comprising:
from 45% to 94.95% by weight of a matrix consisting of at least one polyamide, in particular from 55% to 94.95%;
from 0.05% to 20% by weight of at least one prepolymer, the proportion by weight of polyamide matrix and that of prepolymer being respectively from 60% to 99.9% and from 40% to 0.1%, relative to the sum of polyamide-prepolymer;
from 5% to 45% by weight of at least one impact modifier;
from 0 to 20% of an additive,
said composition having a greater fluidity in the melt state than the same composition devoid of prepolymer, the number-average molecular weight of the polyamide of said composition being substantially identical in the presence or absence of said prepolymer.

Throughout the description, all the percentages of the various constituents of the composition are given by weight.

The expression "substantially identical to" means that the number-average molecular weight of said polyamide does not change by more than 10% in the presence or absence of prepolymer.

Regarding the Polyamide

The term "polyamide" must be understood in the broad sense of the term, containing amide functions resulting from a polycondensation reaction between the carboxylic acid and amine functions.

The nomenclature used to define polyamides is described in standard ISO 1874-1:2011 *Plastics—Polyamide (PA) molding and extrusion materials—Part 1: Designation*, especially on page 3 (tables 1 and 2) and is well known to those skilled in the art.

According to the present application, the term "polyamide", also denoted "PA", covers:
homopolymers,
copolymers, or copolyamides, based on various amide units, such as, for example, copolyamide 6/12 with amide units derived from lactam 6 and lactam 12.

The symbol "/" serves to delimit the units of a copolymer.

Advantageously, the polyamide of the matrix present in the above composition is chosen from aliphatic, linear or branched polyamides, cycloaliphatic polyamides, semi-aromatic polyamides, aromatic polyamides and PEBAs.

Aliphatic, Linear or Branched Polyamides, Cycloaliphatic Polyamides, Semi-Aromatic Polyamides, Aromatic Polyamides:

The polyamides are obtained from an aminocarboxylic acid (also referred to as amino acid), a lactam or a unit corresponding to the formula X.Y, X being a Ca diamine and Y being a Cb diacid, also referred to as (Ca diamine).(Cb diacid), with a representing the number of carbon atoms of the diamine and b representing the number of carbon atoms of the diacid, a and b each ranging from 4 to 36.

When the polyamide is obtained from a unit derived from an amino acid, it may be chosen from 9-aminononanoic acid, 10-aminodecanoic acid, 10-aminoundecanoic acid, 11-aminoundecanoic acid and 12-aminododecanoic acid and derivatives thereof, especially N-heptyl-11-aminoundecanoic acid. When the polyamide is obtained from a unit derived from a lactam, it may be chosen from pyrrolidinone, 2-piperidinone, caprolactam, enantholactam, caprylolactam, pelargolactam, decanolactam, undecanolactam and lauryllactam.

When the polyamide is obtained from a unit derived from a unit corresponding to the formula (Ca diamine).(Cb diacid), the (Ca diamine) unit is chosen from aliphatic, linear or branched diamines, cycloaliphatic diamines and alkylaromatic diamines.

When the diamine is aliphatic and linear, of formula $H_2N-(CH_2)a-NH_2$, the (Ca diamine) monomer is preferentially chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22) and diamines obtained from fatty acids.

When the diamine is aliphatic and branched, it may comprise one or more methyl or ethyl substituents on the main chain. For example, the (Ca diamine) monomer may advantageously be chosen from 2,2,4-trimethyl-1,6-hexanediamine, 2,4,4-trimethyl-1,6-hexanediamine, 1,3-diaminopentane, 2-methyl-1,5-pentanediamine, 2-methyl-1,8-octanediamine.

When the (Ca diamine) monomer is cycloaliphatic, it is preferentially chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), p-bis(aminocyclohexyl)methane (PACM) and isopropylidenedi(cyclohexylamine) (PACP). It may also comprise the following carbon backbones: norbornylmethane, cyclohexylmethane, dicyclohexylpropane, di(methylcyclohexyl), di(methylcyclohexyl)propane. A non-exhaustive list of these cycloaliphatic diamines is given in the publication "Cycloaliphatic Amines" (Encyclopaedia of Chemical Technology, Kirk-Othmer, 4th Edition (1992), pp. 386-405).

When the (Ca diamine) monomer is alkylaromatic, it is preferentially chosen from 1,3-xylylenediamine and 1,4-xylylenediamine.

When the unit C is a unit corresponding to the formula (Ca diamine).(Cb diacid), the (Cb diacid) unit is chosen from aliphatic, linear or branched diacids, cycloaliphatic diacids and aromatic diacids.

When the (Cb diacid) monomer is aliphatic and linear, it is preferentially chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanedioic acid (b=18), octadecenedioic acid (b=18), eicosanedioic acid (b=20), docosanedioic acid (b=22) and fatty acid dimers containing 36 carbons.

The fatty acid dimers mentioned above are dimerized fatty acids obtained by oligomerization or polymerization of unsaturated monobasic fatty acids bearing a long hydrocarbon-based chain (such as linoleic acid and oleic acid), as described especially in document EP 0 471 566.

When the diacid is cycloaliphatic, it may comprise the following carbon backbones: norbornylmethane, cyclohexylmethane, dicyclohexylmethane, dicyclohexylpropane, di(methylcyclohexyl), di(methylcyclohexyl)propane.

When the diacid is aromatic, it is preferentially chosen from terephthalic acid (denoted T), isophthalic acid (denoted I) and naphthalenic diacids.

More particularly preferably, the polyamide is obtained from a single aminocarboxylic acid, a single lactam or a single X.Y unit.

Nonetheless, it is entirely possible to envisage using, to obtain this polyamide, a mixture of two or more aminocarboxylic acids, a mixture of two or more lactams, but also a mixture of one, two or more aminocarboxylic acids with one, two or more lactams.

Advantageously, the second lactam or amino acid represents up to 30% by weight of the sum of the two lactams or amino acids.

Also, each monomer of the X.Y unit may be substituted by another X' and/or Y' monomer, different from X or Y.

Advantageously, the second X' and/or Y' monomer represents up to 30% by weight of the sum of X+X' and/or Y+Y'.

PEBAs:

PEBAs are copolymers (A) with amide units (Aa1) and polyether units (Aa2) which result from the copolycondensation of polyamide blocks bearing reactive end groups with polyether blocks bearing reactive end groups, such as, inter alia:

1) Polyamide blocks bearing diamine chain ends with polyoxyalkylene blocks bearing dicarboxylic chain ends.
2) Polyamide blocks bearing dicarboxylic chain ends with polyoxyalkylene blocks bearing diamine chain ends, obtained by cyanoethylation and hydrogenation of aliphatic alpha-omega-dihydroxylated polyoxyalkylene blocks referred to as polyalkylene ether diols (polyether diols).
3) Polyamide blocks bearing dicarboxylic chain ends with polyether diols, the products obtained in this specific case being polyetheresteramides. The copolymers of the invention are advantageously of this type.

The polyamide blocks bearing dicarboxylic chain ends originate, for example, from the condensation of polyamide precursors in the presence of a chain-limiting dicarboxylic acid.

The polyamide blocks bearing diamine chain ends originate, for example, from the condensation of polyamide precursors in the presence of a chain-limiting diamine.

The polymers bearing polyamide blocks and polyether blocks may also comprise randomly distributed units. These polymers may be prepared by the simultaneous reaction of the polyether and of the precursors of the polyamide blocks.

For example, it is possible to react polyether diol, polyamide precursors and a chain-limiting diacid. A polymer is obtained essentially having polyether blocks and polyamide blocks of very variable length, but also the various reagents that have reacted randomly, which are distributed randomly (statistically) along the polymer chain.

It is also possible to react polyetherdiamine, polyamide precursors and a chain-limiting diacid. A polymer is obtained essentially having polyether blocks and polyamide blocks of very variable length, but also the various reagents that have reacted randomly, which are distributed randomly (statistically) along the polymer chain.

Amide Unit (Aa1):

The amide unit (Aa1) corresponds to a repeating aliphatic unit as defined above for the polyamide.

Advantageously, (Aa1) represents 11-aminoundecanoic acid or undecanolactam.

Polyether Unit (Aa2):

The polyether units are especially derived from at least one polyalkylene ether polyol.

The number-average molecular weight of the polyether blocks is advantageously from 200 to 4000 g/mol, preferably from 250 to 2500 g/mol, especially from 300 to 1100 g/mol.

The copolymer (A) may be prepared by the method according to which:
in a first step, the polyamide blocks (Ba1) are prepared by polycondensation
of the diamine(s);
of the dicarboxylic acid(s); and
where appropriate, of the comonomer(s) chosen from lactams and alpha-omega-aminocarboxylic acids;
in the presence of a chain limiter chosen from the dicarboxylic acids; then
in a second step, the polyamide blocks (Aa1) obtained are reacted with the polyether blocks (Aa2), in the presence of a catalyst.

The general two-step preparation method for the copolymers of the invention is known and described, for example, in French patent FR 2 846 332 and European patent EP 1 482 011.

The reaction for forming block (Aa1) is customarily carried out between 180 and 300° C., preferably from 200 to 290° C., and the pressure in the reactor becomes established at between 5 and 30 bar and maintained for approximately 2 to 3 hours. The pressure is reduced slowly while returning the reactor to atmospheric pressure and the excess water is then distilled off, for example over one or two hours.

Once the polyamide bearing carboxylic acid end groups has been prepared, the polyether and a catalyst are then added. The polyether may be added in one or more portions, as may the catalyst. According to an advantageous form, the polyether is first added; the reaction of the OH end groups of the polyether and of the COOH end groups of the polyamide begins with formation of ester bonds and elimination of water. As much water as possible is eliminated from the reaction medium by distillation and the catalyst is then introduced to complete the bonding of the polyamide blocks and the polyether blocks. This second step is carried out with stirring, preferably under a vacuum of at least 15 mmHg (2000 Pa) at a temperature such that the reagents and the copolymers obtained are in the melt state. By way of example, this temperature may be between 100 and 400° C. and usually between 200 and 300° C. The reaction is monitored by measuring the torque exerted by the molten polymer on the stirrer or by measuring the electrical power consumed by the stirrer. The end of the reaction is determined by the target torque or power value.

It is also possible to add, during synthesis, at the moment deemed to be the most opportune, one or more molecules used as antioxidant, for example Irganox® 1010 or Irganox® 245.

It is also possible to consider the method for preparing copolyamide (A) such that all the monomers are added at the beginning, i.e. in a single step, to bring about the polycondensation:
of the diamine(s);
of the dicarboxylic acid(s); and
where appropriate, of the other polyamide comonomer(s);
in the presence of a chain limiter chosen from the dicarboxylic acids;
in the presence of the (Aa2) (polyether) blocks;
in the presence of a catalyst for the reaction between the flexible (Aa2) blocks and the (Aa1) blocks.

Advantageously, said dicarboxylic acid is used as chain limiter, introduced in excess relative to the stoichiometry of the diamine(s).

Advantageously, a derivative of a metal chosen from the group formed of titanium, zirconium and hafnium, or a strong acid such as phosphoric acid, hypophosphorous acid or boric acid is used as catalyst.

The polycondensation may be carried out at a temperature from 240 to 280° C. Generally speaking, the known copolymers bearing ether and amide units consist of semicrystalline linear, aliphatic polyamide blocks (for example Pebax® from Arkema).

Regarding the Prepolymer

The term prepolymer refers to polyamide oligomers necessarily with a number-average molecular weight lower than that of the polyamides used in the matrix, in particular said prepolymer with a number-average molecular weight of from 1000 to 10 000 g/mol.

The prepolymer may be chosen from oligomers of aliphatic, linear or branched polyamides, oligomers of cycloaliphatic polyamides, oligomers of semi-aromatic polyamides, oligomers of aromatic polyamides, aliphatic, linear or branched, cycloaliphatic, semi-aromatic and aromatic polyamides having the same definition as above.

The prepolymer may also be a copolyamide oligomer or a mixture of polyamide and copolyamide oligomers.

Advantageously, the prepolymer is monofunctional $NH_2$.

Regarding the Impact Modifier

The impact modifier advantageously consists of a polymer having a flexural modulus of lower than 100 MPa measured according to standard ISO-178 and a Tg of less than 0° C. (measured according to standard 11357-2 at the inflection point of the DSC thermogram), in particular a polyolefin, coupled or uncoupled with a PEBA having a flexural modulus of <200 MPa.

The polyolefin of the impact modifier may be functionalized or unfunctionalized or be a mixture of at least one functionalized and/or at least one unfunctionalized. To simplify, the polyolefin has been denoted (B) and functionalized polyolefins (B1) and unfunctionalized polyolefins (B2) have been described below.

An unfunctionalized polyolefin (B2) is conventionally a homopolymer or copolymer of alpha-olefins or diolefins, such as, for example, ethylene, propylene, 1-butene, 1-octene, butadiene. By way of example, mention may be made of:
polyethylene homopolymers and copolymers, in particular LDPE, HDPE, LLDPE (linear low density polyethylene), VLDPE (very low density polyethylene) and metallocene polyethylene,
propylene homopolymers or copolymers,
ethylene/alpha-olefin copolymers such as ethylene/propylene, EPRs (ethylene-propylene rubber) and ethylene/propylene/dienes (EPDMs),
styrene/ethylene-butylene/styrene (SEBS), styrene/butadiene/styrene (SBS), styrene/isoprene/styrene (SIS) or styrene/ethylene-propylene/styrene (SEPS) block copolymers,
copolymers of ethylene with at least one product chosen from the salts or esters of unsaturated carboxylic acids such as alkyl(meth)acrylate (for example methyl acrylate), or vinyl esters of saturated carboxylic acids such as vinyl acetate (EVA), the proportion of comonomer possibly reaching 40% by weight.

The functionalized polyolefin (B1) may be a polymer of alpha-olefins having reactive units (functionalities); such reactive units are acid, anhydride or epoxy functions. By way of example, mention may be made of the previous polyolefins (B2) grafted or copolymerized or terpolymerized by unsaturated epoxides such as glycidyl (meth)acrylate, or by carboxylic acids or the corresponding salts or esters such as (meth)acrylic acid (the latter possibly being totally or partially neutralized by metals such as Zn, etc.) or else by carboxylic acid anhydrides such as maleic anhydride. A functionalized polyolefin is for example a PE/EPR mixture, the weight ratio of which may vary within broad limits, for example between 40/60 and 90/10, said mixture being cografted with an anhydride, especially maleic anhydride, at a degree of grafting for example from 0.01% to 5% by weight.

The functionalized polyolefin (B1) may be chosen from the following (co)polymers, grafted with maleic anhydride or glycidyl methacrylate, in which the degree of grafting is for example from 0.01% to 5% by weight:
- PE, PP, copolymers of ethylene with propylene, butene, hexene or octene containing for example from 35% to 80% by weight of ethylene;
- ethylene/alpha-olefin copolymers such as ethylene/propylene, EPRs (ethylene-propylene rubber) and ethylene/propylene/dienes (EPDMs);
- styrene/ethylene-butylene/styrene (SEBS), styrene/butadiene/styrene (SBS), styrene/isoprene/styrene (SIS) or styrene/ethylene-propylene/styrene (SEPS) block copolymers;
- copolymers of ethylene and vinyl acetate (EVA), containing up to 40% by weight of vinyl acetate;
- copolymers of ethylene and alkyl (meth)acrylate, containing up to 40% by weight of alkyl (meth)acrylate;
- copolymers of ethylene and vinyl acetate (EVA) and alkyl (meth)acrylate, containing up to 40% by weight of comonomers.

The functionalized polyolefin (B1) may also be chosen from ethylene/propylene copolymers, predominant in propylene, grafted by maleic anhydride then condensed with monoaminated polyamide (or a polyamide oligomer) (products described in EP-A-0342066).

The functionalized polyolefin (B1) may also be a copolymer or terpolymer of at least the following units: (1) ethylene, (2) alkyl (meth)acrylate or saturated carboxylic acid vinyl ester and (3) ahydride such as maleic anhydride or (meth)acrylic acid or epoxy, such as glycidyl (meth)acrylate.

By way of example of functionalized polyolefins of the latter type, mention may be made of the following copolymers in which ethylene preferably represents at least 60% by weight and in which the termonomer (the function) represents, for example, from 0.1% to 10% by weight of the copolymer:
- ethylene/alkyl (meth)acrylate/(meth)acrylic acid or maleic anhydride or glycidyl methacrylate copolymers;
- ethylene/vinyl acetate/maleic anhydride or glycidyl methacrylate copolymers;
- ethylene/vinyl acetate or alkyl (meth)acrylate/(meth)acrylic acid or maleic anhydride or glycidyl methacrylate copolymers.

In the preceding copolymers, the (meth)acrylic acid may be salified with Zn or Li.

The term "alkyl (meth)acrylate" in (B1) or (B2) denotes C1 to C8 alkyl methacrylates and acrylates and may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Moreover, the abovementioned polyolefins (B1) may also be crosslinked by any suitable method or agent (diepoxy, diacid, peroxide, etc.); the term functionalized polyolefin also comprises mixtures of the abovementioned polyolefins with a bifunctional reagent such as diacid, dianhydride, diepoxy, etc., capable of reacting with these polyolefins or mixtures of at least two functionalized polyolefins which may react with one another.

The copolymers mentioned above, (B1) and (B2), may be randomly or block copolymerized and have a linear or branched structure.

The molecular weight, the MFI index and the density of these polyolefins may also vary within a broad range, which will be appreciated by those skilled in the art. MFI is the abbreviation for Melt Flow Index. It is measured according to standard ASTM 1238.

The unfunctionalized polyolefins (B2) are advantageously chosen from polypropylene homopolymers or copolymers, and any ethylene homopolymer, or copolymer of ethylene and a comonomer of higher alpha-olefin type, such as butene, hexene, octene, or 4-methyl-1-pentene. Mention may be made, for example, of PPs, high-density PEs, medium-density PEs, linear low-density PEs, low density PEs, very low density PEs. These polyethylenes are known by those skilled in the art to be produced according to a "radical" polymerization process, according to a "Ziegler-Natta" type catalysis, or, more recently, according to a "metallocene" catalysis.

The functionalized polyolefins (B1) are advantageously chosen from any polymer comprising alpha-olefin units and units bearing polar reactive functions, such as epoxy, carboxylic acid or carboxylic acid anhydride functions. By way of example of such polymers, mention may be made of terpolymers of ethylene, alkyl acrylate and maleic anhydride or glycidyl methacrylate, such as Lotader® from the applicant or polyolefins grafted by maleic anhydride such as Orevac® from the applicant, and also terpolymers of ethylene, alkyl acrylate and (meth)acrylic acid. Mention may also be made of homopolymers or copolymers of polypropylene grafted by a carboxylic acid anhydride, then condensed with polyamides or monoaminated polyamide oligomers.

Although the MFI of the polyamide and of (B1) and (B2) may be chosen within a broad range, it is nonetheless recommended, to facilitate dispersion of (B), that the MFI of the polyamide is higher than that of (B).

Regarding the Additives

The composition may also comprise up to 20% by weight, relative to the total weight of the composition, of an additive chosen from antistatic fillers, nucleating agents, lubricants, dyes, pigments, optical brighteners, antioxidants, fibers, in particular aramid fibers, glass fibers, carbon fibers, advantageously glass fibers, fillers, in particular silica, graphite, expanded graphite, carbon black, glass beads, kaolin, magnesia, slag, talc, wollastonite, nanofillers (carbon nanotubes) and stabilizers.

The customary stabilizers used with polymers are phenols, phosphites, UV absorbers, HALS-type stabilizers (Hindered Amine Light Stabilizer), metal iodides, etc. Mention may be made of Irganox 1010, 245, 1098, Irgafos 168, Tinuvin 312, and Iodide P201 from Ciba.

The applicant has therefore found, surprisingly, that the introduction of a prepolymer into a PA/impact modifier composition therefore gives a more fluid composition in the melt state than the same composition devoid of prepolymers, the number-average molecular weight of the polyamide of said composition being substantially identical in the presence or absence of said prepolymer. Another advantage of the invention, aside from the greater fluidity of the compositions, is that the impact and flexural rigidity properties are not altered compared to the properties of the same compositions without prepolymer.

Consequently, there is no reaction between the prepolymer and the polyamide and thus no transamidation reaction between the prepolymer and the polyamide.

Advantageously, the composition of the invention is devoid of thermoplastic polyurethanes.

The polyamide of the matrix is predominant relative to the total polyamides present in the composition.

Advantageously, the polyamide of the matrix present in the composition is an aliphatic polyamide, especially a long-chain polyamide, such as PA11, PA12, or an X.Y polyamide, in particular PA10.10, PA10.12 or PA12.12, or a short-chain polyamide such as PA6, 6.6 or 6.10; in particular, the polyamide is chosen from PA6 and PA11.

Homopolyamides and copolyamides are distinguished from one another by their number of carbon atoms per nitrogen atom, with the knowledge that there are as many nitrogen atoms as amide groups (—CO—NH—).

In the case of a PAX.Y type homopolyamide, the number of carbon atoms per nitrogen atom is the mean of the X unit and the Y unit.

Long-chain polyamide must be understood as a polyamide in which the number of carbons per nitrogen atom is greater than 9.

Short-chain polyamide must be understood as a polyamide in which the number of carbons per nitrogen atom is less than or equal to 9.

Advantageously, said prepolymer corresponds to a polyamide, in particular an aliphatic polyamide, especially chosen from PA6, PA11, PA12 and PA6/12 or a mixture thereof.

Advantageously, a single prepolymer is used in the composition.

Said prepolymer may have a number-average molecular weight of from 1000 to 10 000 g/mol, especially from 1000 to 9000 g/mol, especially from 1000 to 8000 g/mol, especially from 1000 to 7000 g/mol, especially from 1000 to 6000 g/mol, in particular from 1000 to 5000 g/mol, especially from 2000 to 5000 g/mol, especially from 2000 to 4000 g/mol, especially from 2000 to 3000 g/mol, preferably 2500 g/mol.

Advantageously, the proportion by weight of prepolymer is from 0.1% to 20%, especially from 1% to 20%, especially from 3% to 20%, especially from 3% to 15%, relative to the total of the composition.

Advantageously, the proportion by weight of prepolymer is from 1% to 30%, especially from 3% to 25%, relative to the weight of prepolymer-polyamide.

Advantageously, the proportion by weight of prepolymer is from 0.1% to 6%, by weight relative to the weight of prepolymer-polyamide.

Advantageously, the ratio of viscosity at a shear rate of $100\ s^{-1}$ of a composition without prepolymer/viscosity of a composition with prepolymer is at least 1.6, in particular from at least 1.6 to approximately 5, as determined by capillary rheometry on a Goettfert Rheo_tester 2000 at 260° C.

This ratio is determined at a comparable concentration of the various constituents of the composition, that is to say with identical impact modifiers, where appropriate with additives, the proportion of polyamide of the matrix being corrected as a function of the proportion of prepolymer introduced. Consequently, the compositions of the invention have a fluidity dependent on the concentration of prepolymer introduced and greater than that of a composition devoid of prepolymer.

Advantageously, the ratio of flexural modulus at 23° C. of a composition without prepolymer/flexural modulus at 23° C. of a composition with prepolymer is approximately 1, as determined according to ISO 178: 2010.

Advantageously, the ratio of notched impact at −30° C. of a composition without prepolymer/notched impact at −30° C. of a composition with prepolymer is approximately 1, as determined according to ISO 179-1: 2010 eA.

Advantageously, the compositions of the invention have a viscosity ratio of at least 1.6, in particular of at least 1.6 to approximately 5, and a flexural modulus ratio of approximately 1, and a notched impact ratio of approximately 1, these three ratios being as defined previously.

The present prepolymer does not affect the properties, especially of modulus and of shock, of the polyamide with which it is introduced into the composition.

The prepolymer may comprise a number of carbons per nitrogen atom that is different from that of the polyamide, or identical to that of the polyamide or else close to that of the polyamide.

The polyamide and the prepolymer may thus both be long-chain or both be short-chain or else the polyamide is long-chain and the prepolymer short-chain, or the polyamide is short-chain and the prepolymer is long-chain.

Advantageously, in the composition of the invention, the prepolymer is chosen from short-chain polyamides and is compatible with the polyamide of the matrix, in particular the polyamide of the matrix is chosen from short-chain polyamides. The short-chain prepolymer and the short-chain polyamide of the matrix may be chosen from the following: 6, 4.6, 6.6, 6.T, 6.1, 6.10, 6.12, 9.T, 9'T, 9' denoting 2-methyl-1,8-octanediamine, that is to say the isomer of 9-diamine or 1,9-nonanediamine, 6/6.6, 6.T/6.6, 6.T/6.I/6.6.

By way of example, in the composition of the invention, the prepolymer consists of PA6 and the polyamide is a short-chain PA, in particular a PA6, PA6.Y, Y representing a $C_4$-$C_{12}$ diacid, especially a PA6.10 or a PA6.12.

According to another example, the prepolymer consists of a PA6/12 copolymer and the polyamide is a short-chain PA, in particular a PA6 or a PA6.12. It is obvious that the ratio of monomers in the PA6/PA12 copolyamide may be between 0.1/99.9 to 99.9/0.1 by weight.

Advantageously, in the composition of the invention, the prepolymer is chosen from long-chain polyamides and is compatible with the polyamide of the matrix, in particular the polyamide of the matrix is chosen from long-chain polyamides, in particular aliphatic, semi-aromatic or cycloaliphatic.

The long-chain prepolymer and the long-chain polyamide of the matrix may be chosen from the following: 12, 11, 10.10, 10.12, 6.18, 10.T, 12.T, 12/10.T, 12.12, 10.10/10.12 and 10.10/10.T.

By way of example, the prepolymer consists of PA11 and the polyamide is chosen from PA11, PA12, PA10.10 and PA10.12.

Advantageously, the impact modifier used in the composition is chosen from a polyolefin or a mixture of several polyolefins or an unreactive PEBA.

Especially, a portion or all of the polyolefins bears a function chosen from carboxylic acid, carboxylic anhydride and epoxide functions, and is in particular chosen from a copolymer of ethylene and propylene with elastomeric character (EPR), an ethylene-propylene-diene copolymer with elastomeric character (EPDM) and an ethylene/alkyl (meth)acrylate copolymer, an ethylene-higher alkene copolymer, in particular an ethylene-octene copolymer, or an ethylene-alkyl acrylate-maleic anhydride terpolymer.

Advantageously, the impact modifier is chosen from F493, a Lotader®, in particular Lotader 5500 or Lotader 7500, VA1803, or a mixture thereof; in this case they are in a ratio ranging from 0.1/99.9 to 99.9/0.1, preferentially 1/2 to 2/1 when they are in a mixture of two.

By way of example, the impact modifier is chosen from the following mixtures: F493/Lotader®, in particular F493/Lotader® 5500 or F493/Lotader® 7500.

Advantageously, the impact modifier in the composition of the invention is present in a proportion of from 5% to 45% by weight, in particular from 10% to 30% by weight, especially from 15% to 30% by weight relative to the total weight of the composition.

Advantageously, the additives of the composition are chosen from stabilizers, dyes, plasticizers, fibers, fillers and impact modifiers other than polyolefins.

According to another aspect, the invention relates to the use of a composition as defined above, for the manufacture of articles obtained by extrusion, injection or molding.

The articles obtained by extrusion may be pipes or tubes for the distribution of fluids, especially of petrol, compressed air or refrigerant fluid.

The articles obtained by injection are for example sports articles, in particular sports shoes and especially ski boots or running shoes.

The articles obtained by molding may be tanks, in particular tanks for petrol or gas.

According to another aspect, the present invention relates to a method for preparing articles as defined above, comprising a step of extrusion, injection or molding of the composition defined above.

According to another aspect, the present invention relates to the articles as obtained by the method defined above.

The polyamide composition used in the invention may be prepared by compounding the polyamide of the matrix, the prepolymer and the impact modifier, optionally the mold-release agent and also other optional components.

The composition is customarily recovered in the form of pellets or granules. According to another aspect, the invention relates to the use of a prepolymer with a matrix consisting of at least one polyamide, an impact modifier and optionally an additive, to constitute a composition having a greater fluidity in the melt state than the same composition devoid of prepolymer and the polyamide of which has a number-average molecular weight substantially identical in the presence or absence of said prepolymer,
said polyamide being present in a proportion of 45% to 94.95% by weight, in particular from 55% to 94.95% by weight;
said prepolymer being present in a proportion of 0.05% to 20% by weight;
the proportion by weight of polyamide matrix and that of prepolymer being respectively from 60% to 99.9% and from 40% to 0.1%, relative to the sum of polyamide-prepolymer;
said impact modifier being present in a proportion of 5% to 45% by weight; and
said additive being in a proportion by weight of 0 to 20%; the sum of the polyamide, prepolymer, impact modifier and optionally additives being equal to 100%.

The polyamide, the prepolymer, the impact modifier and the additive are as defined above.

The inventors found that the prepolymer reacted preferentially with the impact modifier and not with the polyamide when mixed with an impact modifier and a polyamide and consequently there is no transamidation reaction of the prepolymer with the polyamide. The number-average molecular weight of the polyamide is therefore substantially identical in the presence or absence of said prepolymer.

Advantageously, said constituted composition is devoid of resin from the polyurethanes series.

According to another aspect, the present invention relates to a method for preparing a composition comprising placing a prepolymer in contact with a matrix consisting of at least one polyamide, an impact modifier and optionally an additive,
said polyamide being present in a proportion of 45% to 94.95% by weight;
said prepolymer being present in a proportion of 0.05% to 20% by weight;
the proportion by weight of polyamide matrix and that of prepolymer being respectively from 60% to 99.9% and from 40% to 0.1%, relative to the sum of polyamide-prepolymer;
said impact modifier being present in a proportion of 5% to 45% by weight; and
said additive being in a proportion by weight of 0 to 20%; the sum of the polyamide, prepolymer, impact modifier and optionally additives being equal to 100%,
said composition having a greater fluidity in the melt state than the same composition devoid of prepolymer, the number-average molecular weight of the polyamide of said composition being substantially identical in the presence or absence of said prepolymer, said method being devoid of transamidation reaction between said prepolymer and said polyamide.

The three constituents—prepolymer, polyamide and impact modifier—are placed in contact simultaneously thereby enabling the prepolymer to react preferentially with the impact modifier and not to enter into transamidation reactions with the polyamide, the number-average molecular weight of which is therefore substantially identical in the presence or absence of said prepolymer.

EXAMPLES

Products Used

Figure 1:
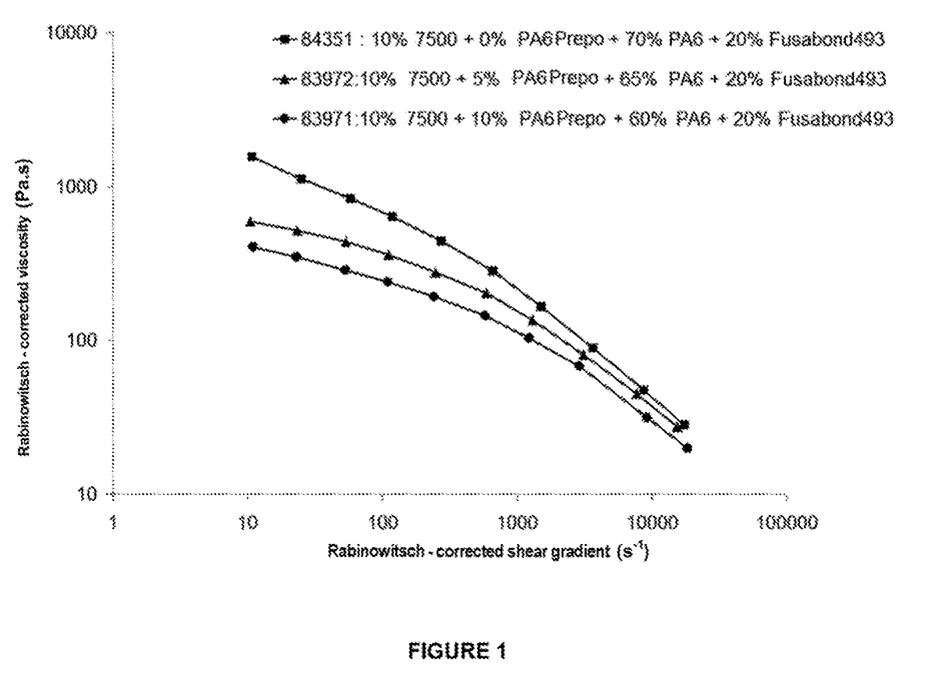
FIG. 1 presents the capillary rheometry, on a Goettfert Rheo_tester 2000 at 260° C., of compositions of the invention consisting of variable amounts of PA6 (proportions of 60% to 70% by weight) and of impact modifier (Lotader 7500: 10% by weight and Fusabond F493: 20% by weight) in the presence of variable amounts of PA6 prepolymer (from 0 to 10% by weight).
Abscissa: Rabinowitsch-corrected shear gradient ($s^{-1}$)
Ordinate: Rabinowitsch-corrected viscosity (Pa·s)
Square: 0% PA6 prepolymer and 70% PA6 (matrix)
Triangle: 5% PA6 prepolymer and 65% PA6 (matrix)
Circle: 10% PA6 prepolymer and 60% PA6 (matrix)
Figure 2:
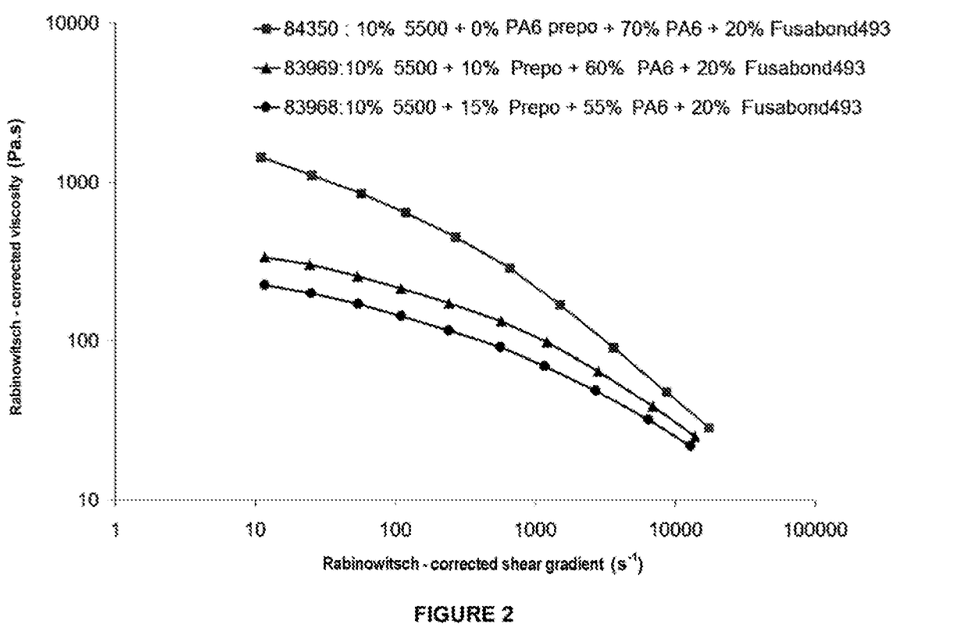
FIG. 2 presents the capillary rheometry, on a Goettfert Rheo_tester 2000 at 260° C., of compositions of the invention consisting of PA6 (proportions of 55% to 70% by weight) and of impact modifier (Lotader 5500: 10% by weight and Fusabond F493: 20% by weight) in the presence of variable amounts of PA6 prepolymer.
Abscissa: Rabinowitsch-corrected shear gradient ($s^{-1}$)
Ordinate: Rabinowitsch-corrected viscosity (Pa·s)
Square: 0% PA6 prepolymer and 70% PA6 (matrix)
Triangle: 10% PA6 prepolymer and 60% PA6 (matrix)
Circle: 15% PA6 prepolymer and 55% PA6 (matrix)
Figure 3:
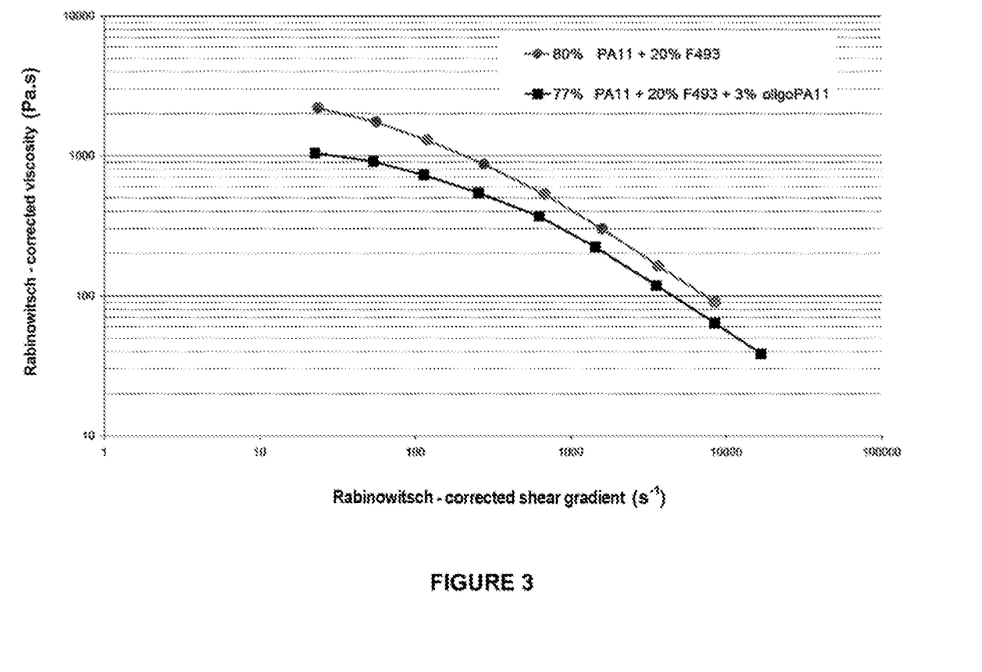
FIG. 3 presents the capillary rheometry, on a Goettfert Rheo_tester 2000 at 260° C.,
of compositions of the invention (PA11 and 20% impact modifier: Fusabond F493 in the presence or absence of 3% by weight of PA11 prepolymer)
Abscissa: Rabinowitsch-corrected shear gradient ($s^{-1}$)
Ordinate: Rabinowitsch-corrected viscosity (Pa·s)
Circle: 0% PA11 prepolymer and 80% PA11 (matrix)
Square: 3% PA11 prepolymer and 77% PA11 (matrix)
Figure 4:
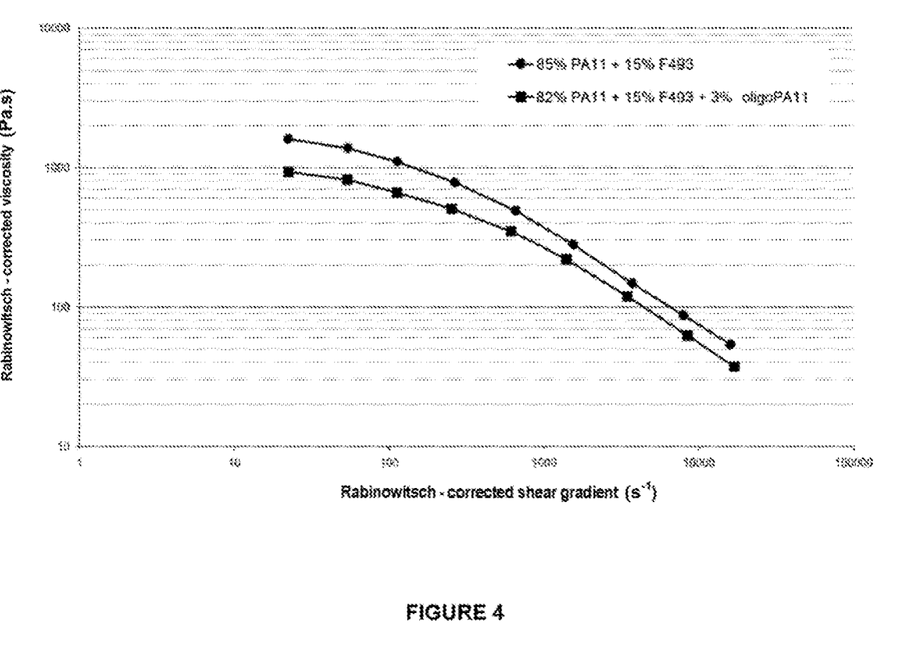
FIG. 4 presents the capillary rheometry, on a Goettfert Rheo_tester 2000 at 260° C., of compositions of the invention (PA11 and 15% impact modifier: Fusabond F493 in the presence or absence of 3% by weight of PA11 prepolymer)
Abscissa: Rabinowitsch-corrected shear gradient ($s^{-1}$)
Ordinate: Rabinowitsch-corrected viscosity (Pa·s)
Circle: 0% PA11 prepolymer and 85% PA11 (matrix)
Square: 3% PA11 prepolymer and 82% PA11 (matrix)
Figure 5:
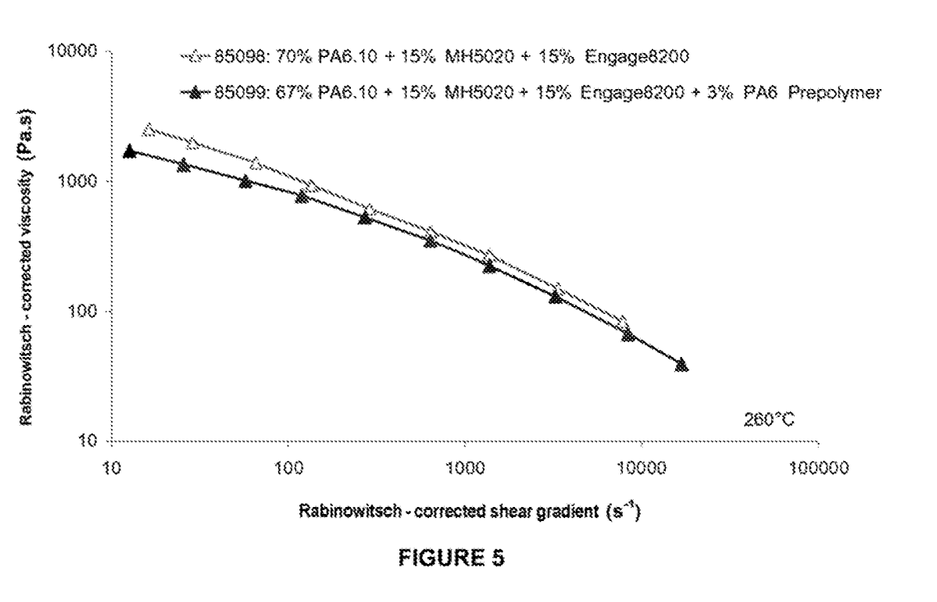
FIG. 5 presents the capillary rheometry, on a Goettfert Rheo_tester 2000 at 260° C., of compositions of the invention (PA6.10, 30% impact modifier: Tafmer MH5020 15% and 15% engage 8200, in the presence or absence of 3% by weight of PA6 prepolymer)
Abscissa: Rabinowitsch-corrected shear gradient ($s^{-1}$)
Ordinate: Rabinowitsch-corrected viscosity (Pa·s)
Unfilled triangle: 0% PA6 prepolymer and 70% PA6.10 (matrix)
Solid triangle: 3% PA6 prepolymer and 67% PA6.10 (matrix)
Figure 6:
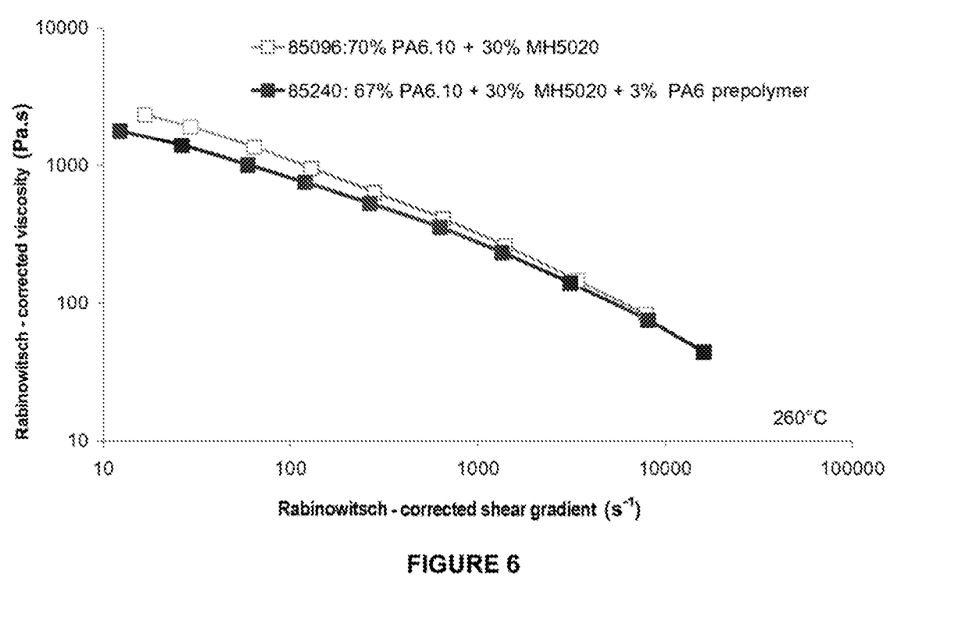
FIG. 6 presents the capillary rheometry, on a Goettfert Rheo_tester 2000 at 260° C., of compositions of the invention (PA6.10, 30% impact modifier: Tafmer MH5020 in the presence or absence of 3% by weight of PA6 prepolymer)
Abscissa: Rabinowitsch-corrected shear gradient ($s^{-1}$)
Ordinate: Rabinowitsch-corrected viscosity (Pa·s)
Unfilled square: 0% PA6 prepolymer and 70% PA6.10 (matrix)
Solid square: 3% PA6 prepolymer and 67% PA6.10 (matrix)
Figure 7:
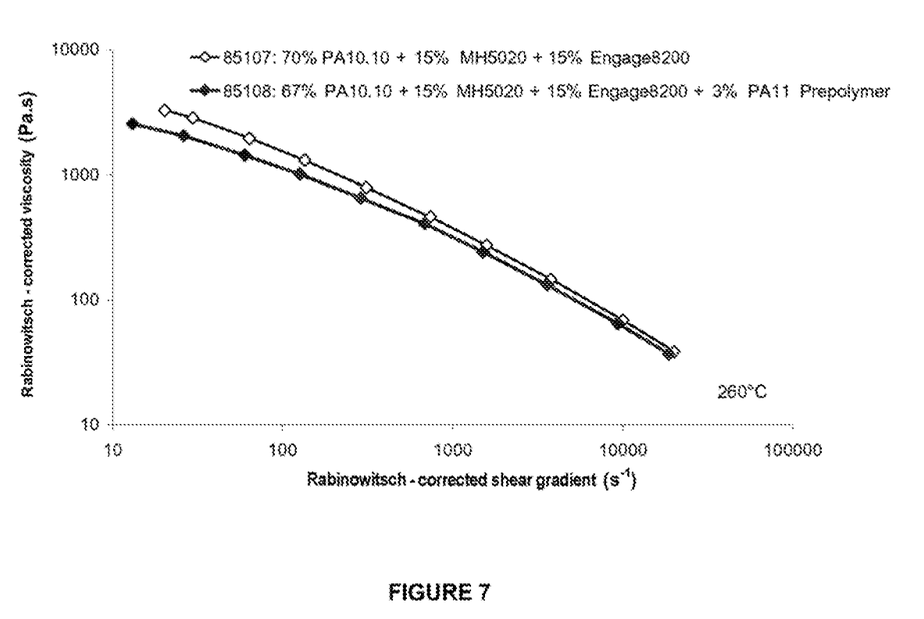
FIG. 7 presents the capillary rheometry, on a Goettfert Rheo_tester 2000 at 260° C., of compositions of the invention (PA10.10, 30% impact modifier: Tafmer MH5020 15% and 15% engage 8200, in the presence or absence of 3% by weight of PA11 prepolymer)
Abscissa: Rabinowitsch-corrected shear gradient ($s^{-1}$)
Ordinate: Rabinowitsch-corrected viscosity (Pa·s)
Unfilled diamond: 0% PA11 prepolymer and 70% PA10.10 (matrix)
Solid diamond: 3% PA11 prepolymer and 67% PA10.10 (matrix)
Figure 8:
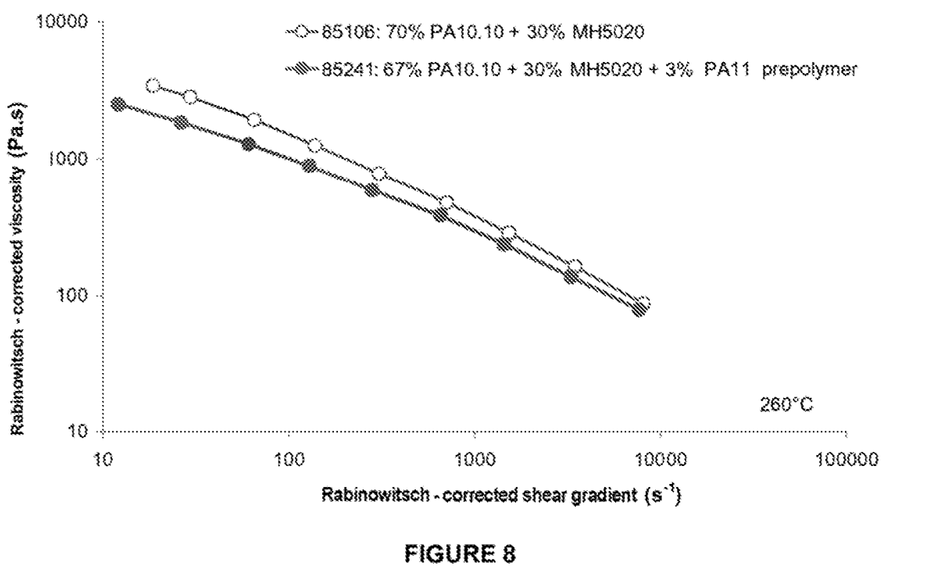
FIG. 8 presents the capillary rheometry, on a Goettfert Rheo_tester 2000 at 260° C., of compositions of the invention (PA10.10, 30% impact modifier: Tafmer MH5020 in the presence or absence of 3% by weight of PA11 prepolymer)
Abscissa: Rabinowitsch-corrected shear gradient ($s^{-1}$)
Ordinate: Rabinowitsch-corrected viscosity (Pa·s)
Unfilled circle: 0% PA11 prepolymer and 70% PA10.10 (matrix)
Solid circle: 3% PA11 prepolymer and 67% PA10.10 (matrix)

Fusabond 493: maleic anhydride (MAH)-grafted ethylene-octene copolymer sold by Dupont.
Lotader 7500 and 5500: ethylene/alkyl acrylate/maleic anhydride terpolymer sold by the applicant.
Exxelor TM VA 1803: maleic anhydride-grafted ethylene and propylene copolymer sold by Exxon Mobil Chemical.
Tafmer MH5020: maleic anhydride (MAH)-grafted ethylene-butene copolymer sold by Mitsui Chemicals
Engage 8200: ethylene-octene copolymer sold by Dow Chemical.
Domamid 24: polyamide 6 sold by Domo Chemicals (iv=1.15 dl/g measured in meta-cresol).
PA11 KNO (iv=1.42) produced by the applicant.
PA6.10: polyamide 6.10 produced by the applicant (iv=1.2 dl/g measured in meta-cresol).
PA10.10 (iv=1.23 dl/g measured in meta-cresol) produced by the applicant.
Prepolymers: mono $NH_2$ polyamide-11 and polyamide-6 of Mn 2500 g/mol (produced by the applicant).

The following compositions are exemplified:
Compositions of the Invention Based on PA11
  A polyamide-11 (KNO, matrix).
  A maleic anhydride-grafted ethylene-octene copolymer, reference Fusabond 493, sold by Dupont.
  A monofunctional $NH_2$ prepolymer 11 of weight 2500 g/mol.

Example 1

80% PA11 (KNO)+20% F493
77% PA11 (KNO)+20% F493+3% PA11 prepolymer
(PA11 matrix/PA11 prepolymer weight ratio of 96.25/3.75)

Example 2

85% PA11 (KNO, matrix)+15% F493
82% PA11 (KNO, matrix)+15% F493+3% PA11 prepolymer
(PA11 matrix/PA11 prepolymer weight ratio of 96.5/3.5)

Example 3

85% PA11 (KNO, matrix)+15% VA1803
82% PA11 (KNO, matrix)+15% VA1803+3% PA11 prepolymer
(PA11 matrix/PA11 prepolymer weight ratio of 96.5/3.5)

Compositions of the Invention Based on PA6
  A polyamide-6 (reference Domamid 24).
  A maleic anhydride-grafted ethylene-octene copolymer, reference Fusabond 493, sold by Dupont.
  An ethylene/acrylate/maleic anhydride terpolymer (Lotader® range).
  A monofunctional $NH_2$ polyamide-6 prepolymer of weight 2500 g/mol.

Example 4

70% PA6+20% F493+10% Lotader5500
65% PA6+5% PA6 prepolymer+20% F493+10% Lotader5500
PA6/PA6 prepolymer weight ratio of 92.9/7.1
60% PA6+10% PA6 prepolymer+20% F493+10% Lotader5500
PA6/PA6 prepolymer weight ratio of 85.7/14.3
55% PA6+15% PA6 prepolymer+20% F493+10% Lotader5500
(PA6/PA6 prepolymer weight ratio of 78.6/21.4)

Example 5

70% PA6+20% F493+10% Lotader7500
65% PA6+5% PA6 prepolymer+20% F493+10% Lotader7500
(PA6/PA6 prepolymer weight ratio of 92.8/7.1)
60% PA6+10% PA6 prepolymer+20% F493+10% Lotader7500
(PA6/PA6 prepolymer weight ratio of 85.7/14.3)
Compositions of the Invention Based on PA6.10

A polyamide-6.10 (matrix).
A maleic anhydride-grafted ethylene-butene copolymer, reference MH5020, sold by Mitsui Chemicals.
An ethylene-octene copolymer, reference engage 8200, sold by Dow Chemical.
A monofunctional $NH_2$ prepolymer 6 of weight 2500 g/mol.

Example 6

70% PA6.10+15% MH5020+15% engage 8200
67% PA6.10+15% MH5020+15% engage 8200+3% PA6 prepolymer
(PA6.10/PA6 prepolymer weight ratio of 95.7/4.3)

Example 7

70% PA6.10+30% MH5020
67% PA6.10+30% MH5020+3% PA6 prepolymer
(PA6.10/PA6 prepolymer weight ratio of 95.7/4.3)
Compositions of the Invention Based on PA10.10
A polyamide-10.10 (matrix).
A maleic anhydride-grafted ethylene-butene copolymer, reference MH5020, sold by Mitsui Chemicals.
An ethylene-octene copolymer, reference engage 8200, sold by Dow Chemical.
A monofunctional $NH_2$ prepolymer 11 of weight 2500 g/mol.

Example 8

70% PA10.10+15% MH5020+15% engage 8200
67% PA10.10+15% MH5020+15% engage 8200+3% PA11 prepolymer
(PA10.10/PA11 prepolymer weight ratio of 95.7/4.3)

Example 9

70% PA10.10+30% MH5020
67% PA10.10+30% MH5020+3% PA11 prepolymer
(PA10.10/PA11 prepolymer weight ratio of 95.7/4.3)
Compounding:
PA11-Based Formulation:
Thermo Haake PTW 16/25D-type twin screw extruder
Machine temperature: 270° C.
Screw speed: 300 rpm
Flow rate at extruder outlet: 3.5 kg/h
PA6-Based Formulation:
Leistritz-type twin screw extruder
Machine temperature: 240° C.
Screw speed: 300 rpm.
Flow rate at extruder outlet: 15 kg/h.
PA6.10-Based Formulation:
Clextral Evolum 32-type twin screw extruder.
Machine temperature: 270° C.
Screw speed: 300 rpm.
Flow rate at extruder outlet: 40 kg/h.
PA1 0.10-Based Formulation:
Clextral Evolum 32-type twin screw extruder.
Machine temperature: 270° C.
Screw speed: 300 rpm.
Flow rate at extruder outlet: 40 kg/h.
Transformation:
80×10×4 mm³ bars were produced by injection molding.
The following process parameters were used:
PA11-Based Formulation:
Injection temperature (feed/nozzle): 250/270° C.
Mold temperature: 40° C.
Hold time: 15 seconds
Material hold pressure: 500 bar.
Cooling time: 20 seconds
PA6-Based Formulation:
Injection temperature (feed/nozzle): 240/260° C.
Mold temperature: 40° C.
Hold time: 15 seconds
Material hold pressure: 340 bar.
Cooling time: 25 seconds
PA6.10-Based Formulation:
Injection temperature (feed/nozzle): 250/270° C.
Mold temperature: 40° C.
Hold time: 15 seconds
Material hold pressure: 330 bar.
Cooling time: 15 seconds
PA10.10-Based Formulation:
Injection temperature (feed/nozzle): 250/270° C.
Mold temperature: 40° C.
Hold time: 15 seconds
Material hold pressure: 330 bar.
Cooling time: 15 seconds The results for the viscosities of the compositions, the flexural moduli and the notched impact for the bars obtained are given in table I below:

TABLE I

|  | Flexural modulus (room temperature) MPa | Notched impact −30° C. (kJ/m²) | η (100 s⁻¹) in Pa · s | η (1000 s⁻¹) in Pa · s |
|---|---|---|---|---|
| Impact-modified PA6 | | | | |
| 70% PA6 + 0% PA6 prepolymer + 20% F493 + 10% Lotader5500 | 580 | 19 | 645 | 170 |
| 65% PA6 + 5% PA6 prepolymer + 20% F493 + 10% Lotader5500 | 585 | 19 | 370 | 145 |
| 60% PA6 + 10% PA6 prepolymer + 20% F493 + 10% Lotader5500 | 590 | 19 | 210 | 100 |
| 55% PA6 + 15% PA6 prepolymer + 20% F493 + 10% Lotader5500 | 560 | 18 | 140 | 70 |
| 70% PA6 + 0% PA6 prepolymer + 20% F493 + 10% Lotader7500 | 630 | 16 | 635 | 170 |
| 65% PA6 + 5% PA6 oligo + 20% F493 + 10% Lotader7500 | 640 | 16 | 360 | 135 |
| 60% PA6 + 10% PA6 oligo + 20% F493 + 10% Lotader7500 | 595 | 17 | 240 | 100 |

TABLE I-continued

| | Flexural modulus (room temperature) MPa | Notched impact −30° C. (kJ/m²) | η (100 s⁻¹) in Pa · s | η (1000 s⁻¹) in Pa · s |
|---|---|---|---|---|
| Impact-modified PA11 | | | | |
| 85% PA11 + 15% VA1803 | 800 | 34 | 1000 | 230 |
| 82% PA11 + 15% VA1803 + 3% PA11 prepolymer | 820 | 35 | 560 | 195 |
| 80% PA11 + 20% F493 | 705 | 62 | 1375 | 280 |
| 77% PA11 + 20% F493 + 3% PA11 prepolymer | 715 | 60 | 730 | 220 |
| 85% PA11 + 15% F493 | 805 | 29 | 1095 | 280 |
| 82% PA11 + 15% F493 + 3% PA11 prepolymer | 830 | 26 | 670 | 220 |
| Impact-modified PA6.10 | | | | |
| 70% PA6.10 + 15% MH5020 + 15% engage 8200 | 690 | 85 | 1080 | 320 |
| 67% PA6.10 + 15% MH5020 + 15% engage 8200 + 3% PA6 prepolymer | 670 | 78 | 820 | 270 |
| 70% PA6.10 + 30% MH5020 | 670 | 98 | 1070 | 320 |
| 67% PA6.10 + 30% MH5020 + 3% PA6 prepolymer | 660 | 95 | 780 | 240 |
| Impact-modified PA10.10 | | | | |
| 70% PA10.10 + 15% MH5020 + 15% engage 8200 | 640 | 78 | 1500 | 370 |
| 67% PA10.10 + 15% MH5020 + 15% engage 8200 + 3% PA6 prepolymer | 600 | 75 | 1090 | 320 |
| 70% PA10.10 + 30% MH5020 | 600 | 92 | 1500 | 370 |
| 67% PA10.10 + 30% MH5020 + 3% PA6 prepolymer | 600 | 90 | 930 | 270 |

The examples described above show that the impact-modified compositions of the invention which comprise a prepolymer have a greater fluidity in the melt state than the same compositions without prepolymer, while the impact and flexural rigidity properties are not adversely affected.

Example 10

Change in the Number-Average Molecular Weight of a Polyamide Placed in Contact with an Impact Modifier in the Presence or Absence of a Prepolymer

| | GPC results | |
|---|---|---|
| | Mn g/mol | Mw g/mol |
| Cpd 84455 (PA 11 + 20% F493) | 40900 | 85200 |
| Cpd 84456 (77% PA 11 + 20% F493 + 3% mono-NH2 PA11 prepolymer) | 37400 | 84400 |

The weights are expressed as PMMA equivalent (g/mol) and were measured based on the PA soluble portion.

This example shows that the number-average molecular weight of a PA11 placed in contact with an impact modifier, or simultaneously with an impact modifier and a prepolymer, is substantially identical regardless of the original number-average molecular weight of the PA11, showing that there is no transamidation reaction between the prepolymer and the polyamide.

The invention claimed is:

1. A composition comprising:
   from 45% to 87% by weight of a matrix consisting of at least one polyamide;
   from 3% to 20% by weight of at least one prepolymer, wherein the at least one prepolymer is a monofunctional NH₂ compound;
   from 10% to 45% by weight of at least one impact modifier;
   from 0% to 20% of an additive,
   wherein said composition has a greater fluidity in the melt state than the same composition devoid of prepolymer, the number-average molecular weight of the polyamide of said composition being substantially identical in the presence or absence of said prepolymer,
   wherein the ratio of flexural modulus at 23° C. of a composition without prepolymer/flexural modulus at 23° C. of a composition with prepolymer is approximately 1, as determined according to ISO 178: 2010,
   wherein the ratio of notched impact at −30° C. of a composition without prepolymer/notched impact at −30° C. of a composition with prepolymer is approximately 1, as determined according to ISO 179-1: 2010 eA,
   wherein the impact modifier is chosen from a polyolefin or a mixture of several polyolefins,
   wherein all of the polyolefins comprise a functional group chosen from carboxylic acid, carboxylic anhydride and epoxide functional groups,
   wherein the additives are chosen from stabilizers, dyes, plasticizers, fibers, fillers and impact modifiers other than polyolefins, and
   wherein the at least one polyamide, the at least one prepolymer and the at least one impact modifier are placed in contact simultaneously, and wherein the at least one prepolymer reacts preferentially with the at least one impact modifier and not into a transamidation reaction with the at least one polyamide.

2. The composition of claim 1, wherein the polyamide of the matrix is chosen from: aliphatic, linear or branched polyamides, cycloaliphatic polyamides, semi-aromatic polyamides, aromatic polyamides and polyether block amides (PEBAs).

3. The composition of claim 2, wherein the polyamide is an aliphatic polyamide.

4. The composition of claim 1, wherein the prepolymer corresponds to a polyamide.

5. The composition of claim 1, wherein said prepolymer has a number-average molecular weight of from 1000 to 10,000 g/mol.

6. The composition of claim 1, wherein the proportion by weight of prepolymer is from 3% to 15%, relative to the total of the composition.

7. The composition of claim 1, wherein the prepolymer is compatible with the polyamide.

8. The composition of claim 1, wherein the prepolymer consists of PA6 and the polyamide is a short-chain PA.

9. The composition of claim 1, wherein the prepolymer consists of PA11 and the polyamide is chosen from PA11, PA12, PA10.10 and PA10.12.

10. The composition of claim 1, wherein the prepolymer consists of PA6/12 and the polyamide is chosen from PA6 and PA6.12.

11. The composition of claim 1, wherein the at least one impact modifier is present in a proportion from 10% to 30% by weight, relative to the total weight of the composition.

12. An article of manufacture obtained by extrusion, injection or molding a composition as defined in claim 1.

13. The article of manufacture of claim 12 wherein the article is obtained by injection.

14. The article of manufacture of claim 12 wherein the article is obtained by molding.

15. The composition of claim 1, wherein the sum of the polyamide, prepolymer, impact modifier and optionally additives being equal to 100%.

16. The composition of claim 1, wherein the composition comprises the additive.

17. The composition of claim 1, wherein the at least one impact modifier is a functionalized polyolefin grafted with maleic anhydride or glycidyl methacrylate, and the polyolefin is selected from the group consisting of polypropylene (PP), copolymers of ethylene with propylene, copolymers of ethylene with butene, copolymers of ethylene with hexane, copolymers of ethylene with octane, ethylene-propylene rubber (EPR), ethylene/propylene/dienes (EPDMs), styrene/ethylene-butylene/styrene (SEBS), styrene/butadiene/styrene (SBS), styrene/isoprene/styrene (SIS), styrene/ethylene-propylene/styrene (SEPS), copolymers of ethylene with vinyl acetate (EVA), and copolymers of ethylene with vinyl acetate (EVA) and alkyl (meth)acrylate, or
wherein the at least one impact modifier is a functionalized ethylene/propylene polyolefin copolymer grafted with maleic anhydride then condensed with a monoaminated polyamide or a polyamide oligomer.

18. A method of utilizing a prepolymer with a matrix consisting of at least one polyamide, an impact modifier and optionally an additive, to constitute a composition having a greater fluidity in the melt state than the same composition devoid of prepolymer and the polyamide of which has a number-average molecular weight substantially identical in the presence or absence of said prepolymer,
said polyamide being present in a proportion of 45% to 87% by weight;
said prepolymer being present in a proportion of 3% to 20% by weight, wherein the prepolymer is a monofunctional $NH_2$ compound, wherein the ratio of flexural modulus at 23° C. of a composition without prepolymer/flexural modulus at 23° C. of a composition with prepolymer is approximately 1, as determined according to ISO 178: 2010, wherein the ratio of notched impact at −30° C. of a composition without prepolymer/notched impact at −30° C. of a composition with prepolymer is approximately 1, as determined according to ISO 179-1: 2010 eA;
said impact modifier being present in a proportion of 10% to 45% by weight; and
said additive being in a proportion by weight of 0 to 20%;
the sum of the polyamide, prepolymer, impact modifier and optionally additives being equal to 100%,
wherein the impact modifier is chosen from a polyolefin or a mixture of several polyolefins,
wherein all of the polyolefins comprise a functional group chosen from carboxylic acid, carboxylic anhydride and epoxide functional groups,
wherein the additives are chosen from stabilizers, dyes, plasticizers, fibers, fillers and impact modifiers other than polyolefins, and
wherein the at least one polyamide, the prepolymer and the impact modifier are placed in contact simultaneously, and
wherein the prepolymer reacts preferentially with the impact modifier and not into a transamidation reaction with the at least one polyamide.

19. The method of claim 18, wherein the at least one impact modifier is a functionalized polyolefin grafted with maleic anhydride or glycidyl methacrylate, and the polyolefin is selected from the group consisting of polypropylene (PP), copolymers of ethylene with propylene, copolymers of ethylene with butene, copolymers of ethylene with hexane, copolymers of ethylene with octane, ethylene-propylene rubber (EPR), ethylene/propylene/dienes (EPDMs), styrene/ethylene-butylene/styrene (SEBS), styrene/butadiene/styrene (SBS), styrene/isoprene/styrene (SIS), styrene/ethylene-propylene/styrene (SEPS), copolymers of ethylene with vinyl acetate (EVA), and copolymers of ethylene with vinyl acetate (EVA) and alkyl (meth)acrylate,
or
wherein the at least one impact modifier is a functionalized ethylene/propylene polyolefin copolymer grafted with maleic anhydride then condensed with a monoaminated polyamide or a polyamide oligomer.

20. A method for preparing a composition comprising placing a prepolymer in contact with a matrix consisting of at least one polyamide, an impact modifier and optionally an additive,
said polyamide being present in a proportion of 45% to 87% by weight;
said prepolymer being present in a proportion of 3% to 20% by weight, wherein the prepolymer is a monofunctional $NH_2$ compound, wherein the ratio of flexural modulus at 23° C. of a composition without prepolymer/flexural modulus at 23° C. of a composition with prepolymer is approximately 1, as determined according to ISO 178: 2010, wherein the ratio of notched impact at −30° C. of a composition without prepolymer/notched impact at −30° C. of a composition with prepolymer is approximately 1, as determined according to ISO 179-1: 2010 eA;

said impact modifier being present in a proportion of 10% to 45% by weight; and
said additive being in a proportion by weight of 0 to 20%;
the sum of the polyamide, prepolymer, impact modifier and optionally additives being equal to 100%,
said composition having a greater fluidity in the melt state than the same composition devoid of prepolymer, the number-average molecular weight of the polyamide of said composition being substantially identical in the presence or absence of said prepolymer, said method being devoid of transamidation reaction between said prepolymer and said polyamide,
wherein the impact modifier is chosen from a polyolefin or a mixture of several polyolefins,
wherein all of the polyolefins comprise a functional group chosen from carboxylic acid, carboxylic anhydride and epoxide functional groups,
wherein the additives are chosen from stabilizers, dyes, plasticizers, fibers, fillers and impact modifiers other than polyolefins, and
wherein the at least one polyamide, the prepolymer and the impact modifier are placed in contact simultaneously, and
wherein the prepolymer reacts preferentially with the impact modifier and not into a transamidation reaction with the at least one polyamide.

21. The method of claim 20, wherein the at least one impact modifier is a functionalized polyolefin grafted with maleic anhydride or glycidyl methacrylate, and the polyolefin is selected from the group consisting of polypropylene (PP), copolymers of ethylene with propylene, copolymers of ethylene with butene, copolymers of ethylene with hexane, copolymers of ethylene with octane, ethylene-propylene rubber (EPR), ethylene/propylene/dienes (EPDMs), styrene/ethylene-butylene/styrene (SEBS), styrene/butadiene/styrene (SBS), styrene/isoprene/styrene (SIS), styrene/ethylene-propylene/styrene (SEPS), copolymers of ethylene with vinyl acetate (EVA), and copolymers of ethylene with vinyl acetate (EVA) and alkyl (meth)acrylate,
or
wherein the at least one impact modifier is a functionalized ethylene/propylene polyolefin copolymer grafted with maleic anhydride then condensed with a mono-aminated polyamide or a polyamide oligomer.

* * * * *